S. O. PETERSON.
ROAD BUILDING MACHINE.
APPLICATION FILED JUNE 19, 1920.
1,410,114.
Patented Mar. 21, 1922.
8 SHEETS—SHEET 1.
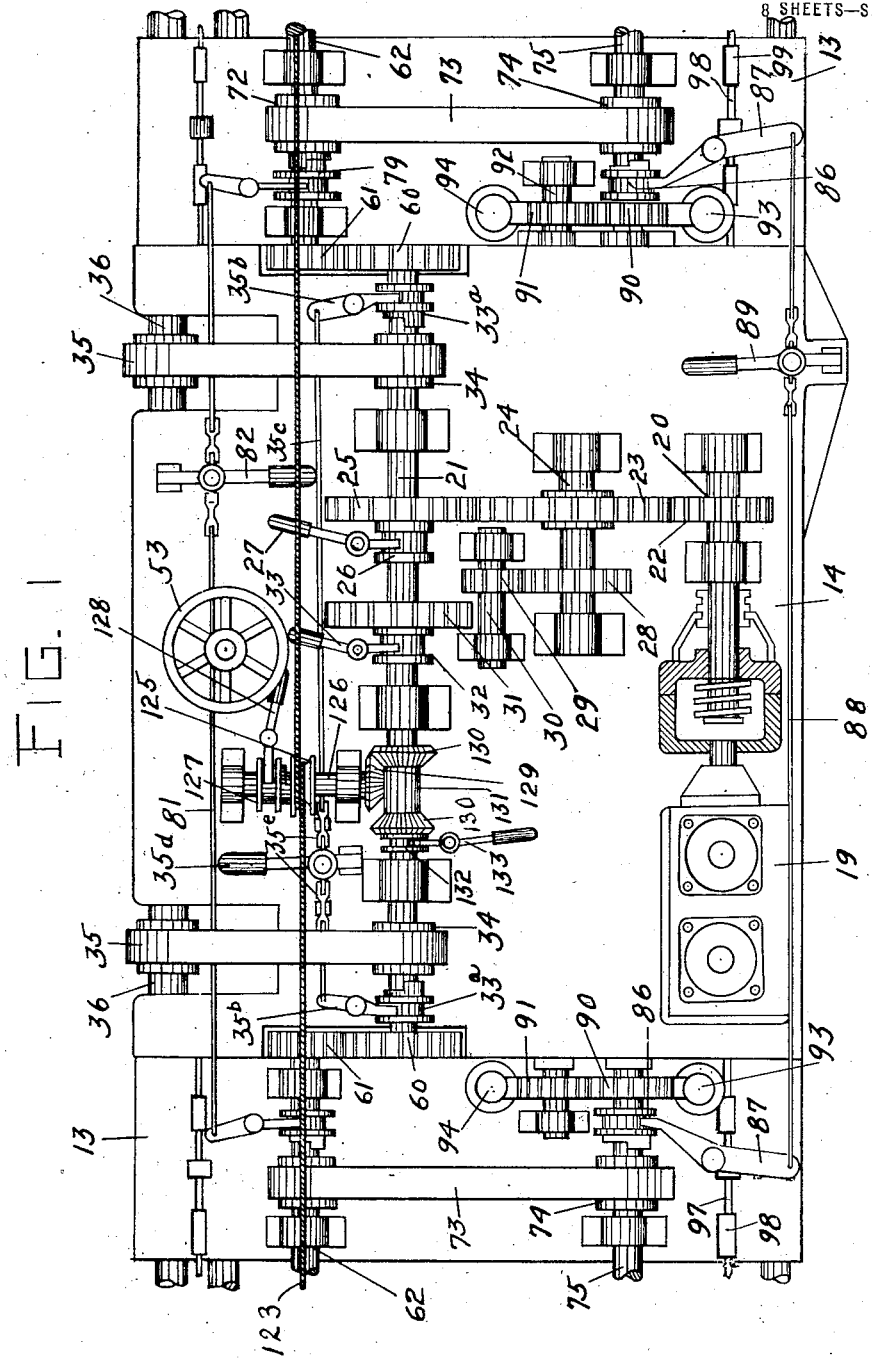
INVENTOR
Swan O. Peterson.
BY Walter N. Haskell,
his ATTORNEY

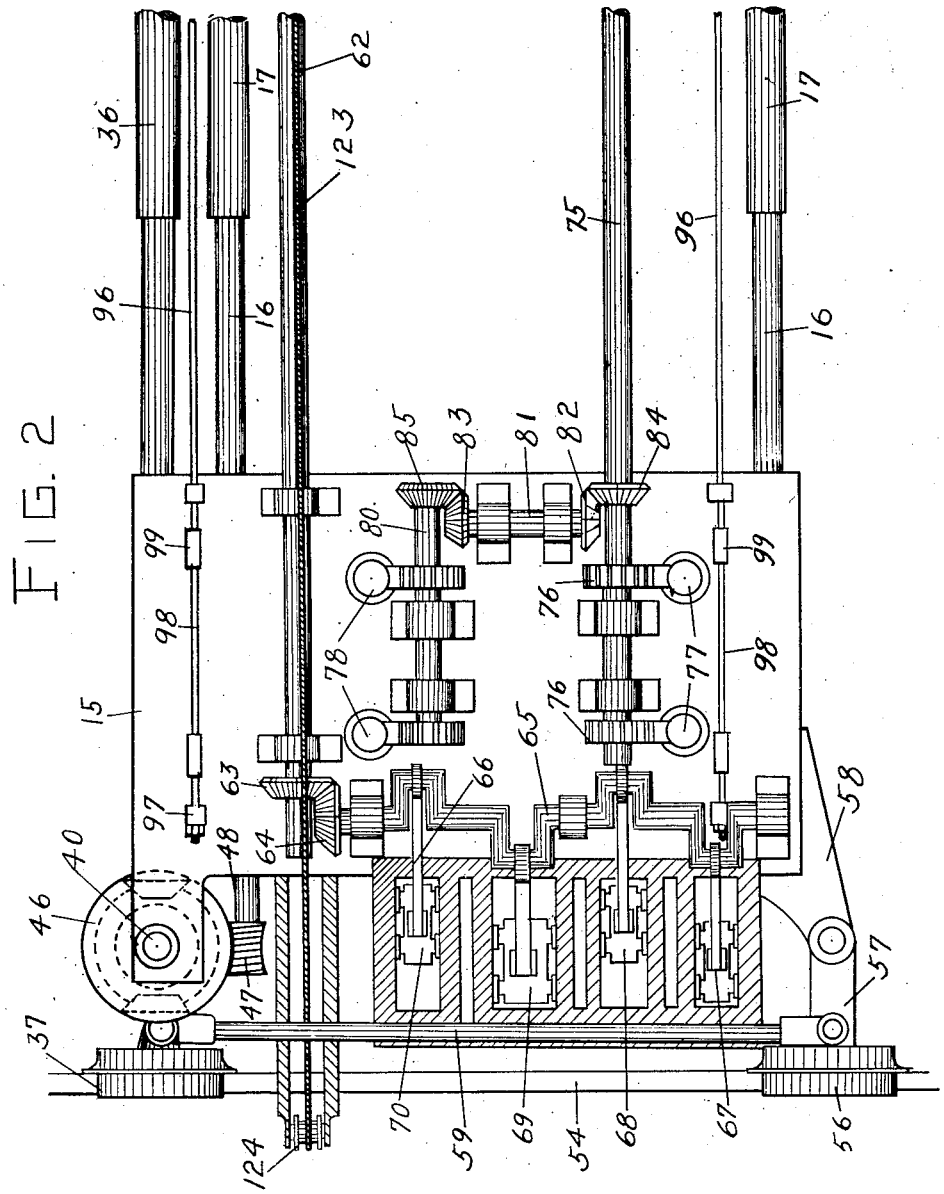

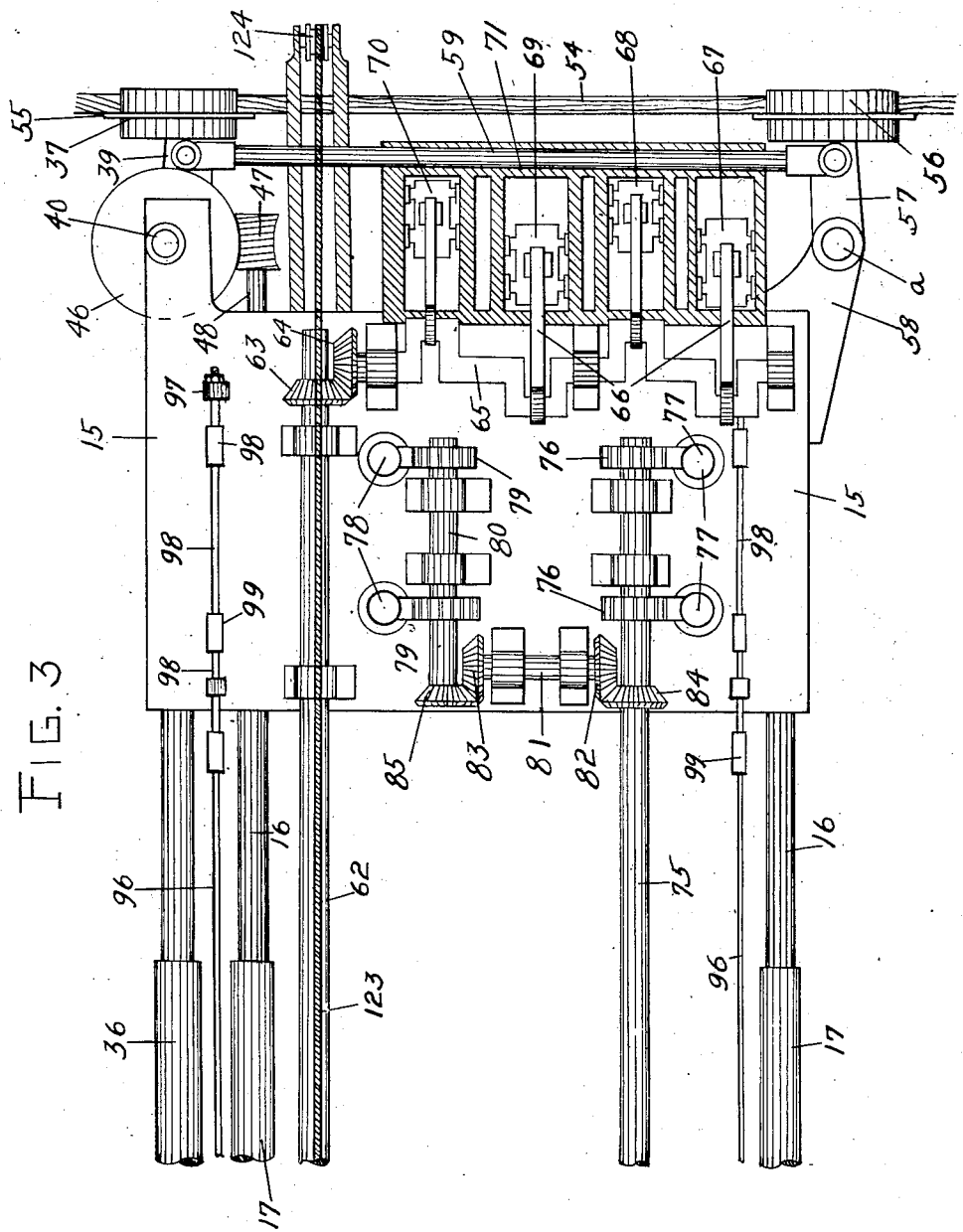

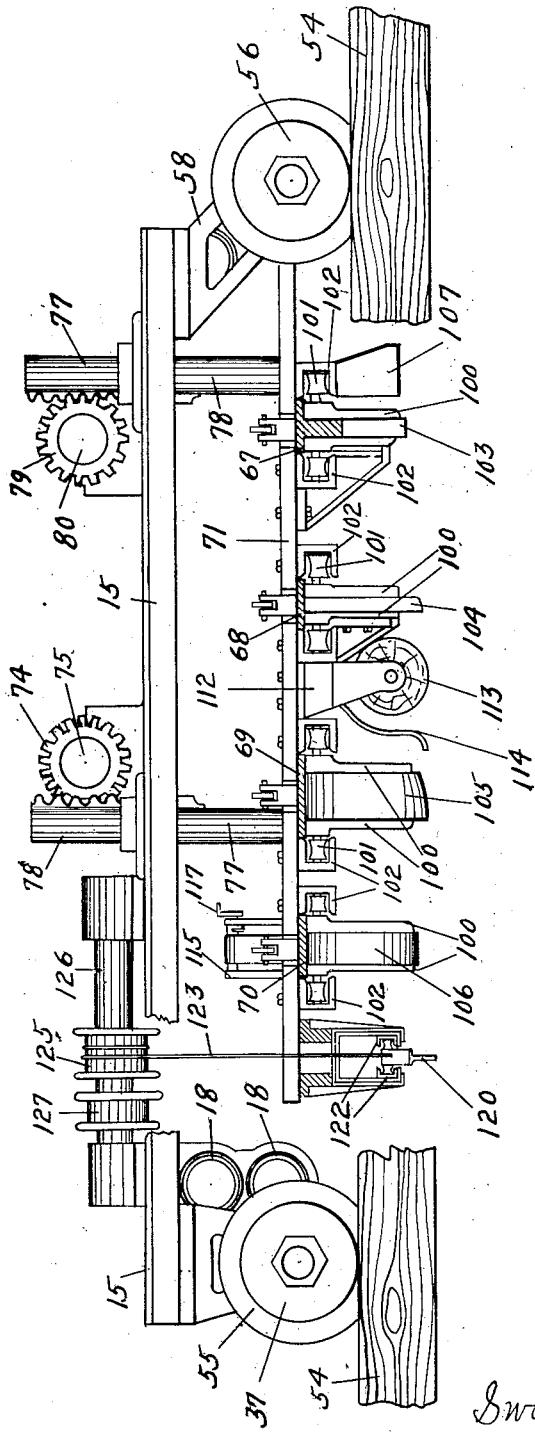

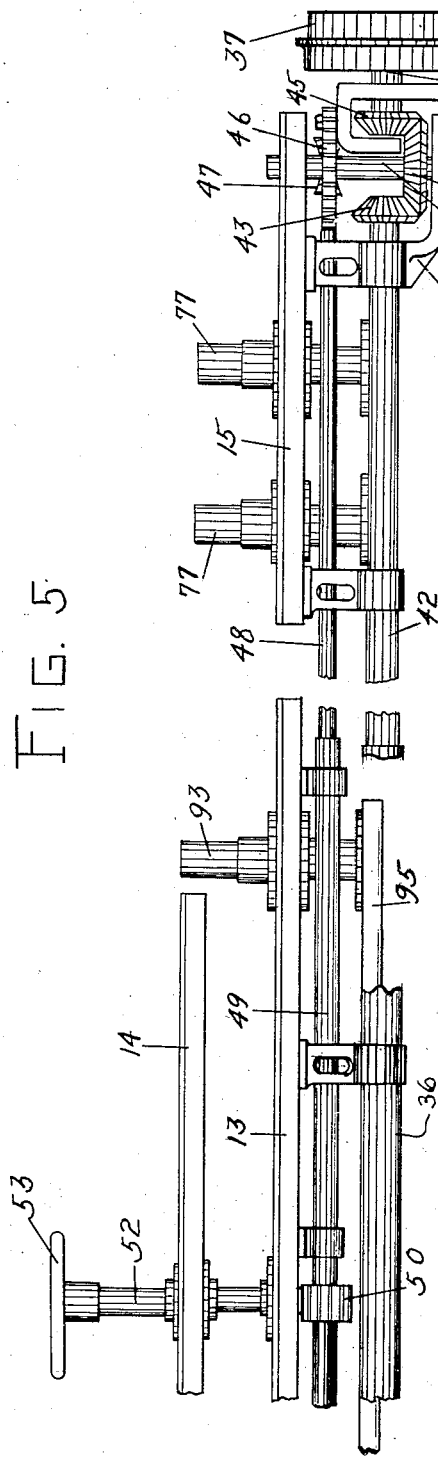

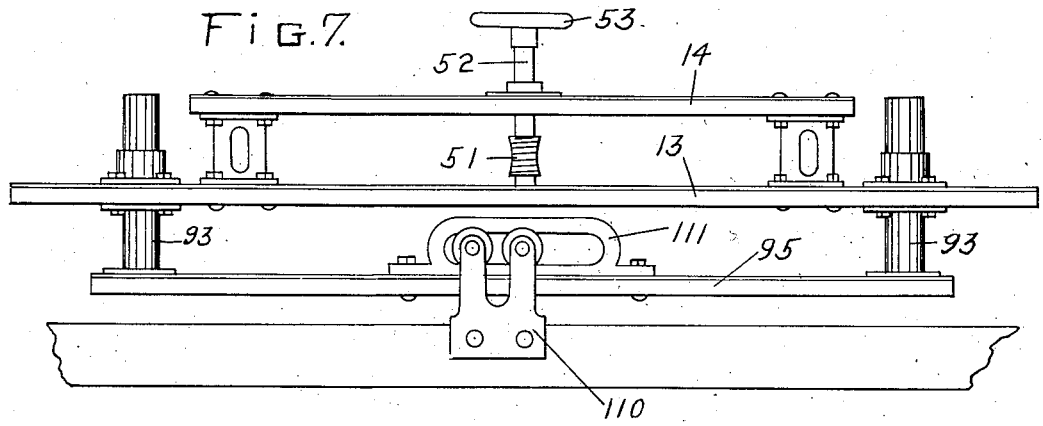
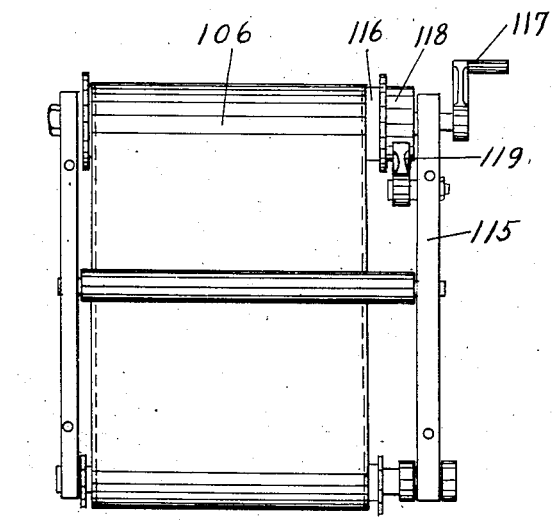

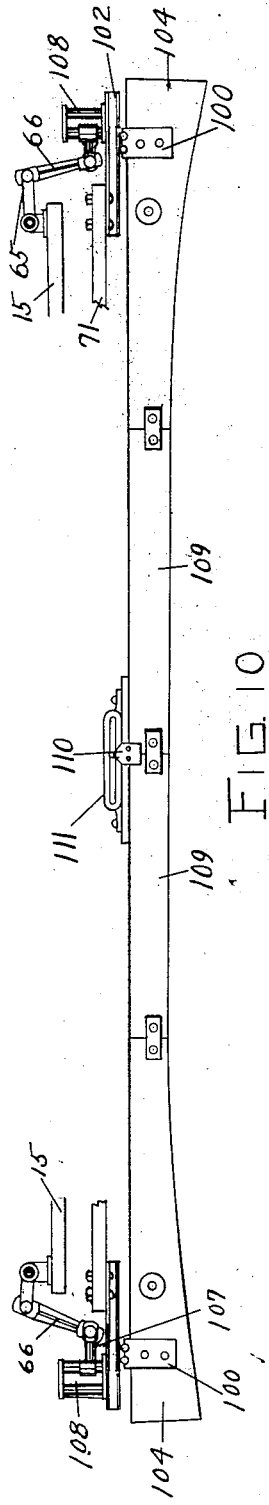

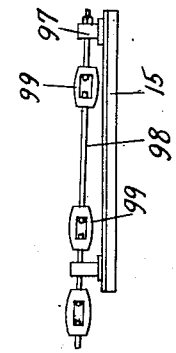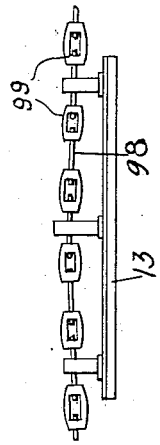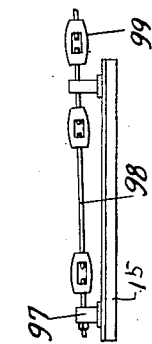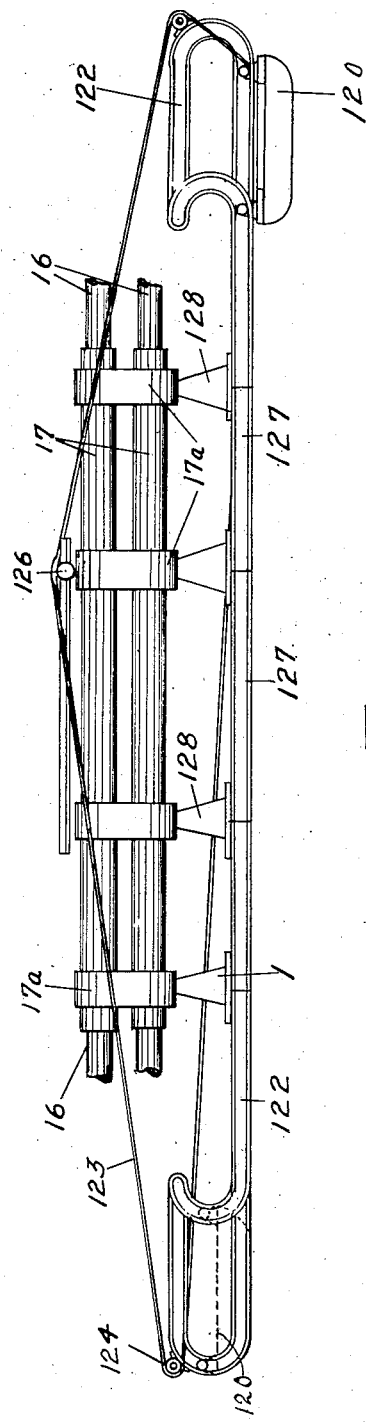

UNITED STATES PATENT OFFICE.

SWAN O. PETERSON, OF ROCK ISLAND, ILLINOIS, ASSIGNOR OF ONE-HALF TO MAUDE M. McCULLOUGH, OF DAVENPORT, IOWA.

ROAD-BUILDING MACHINE.

1,410,114.  Specification of Letters Patent.  Patented Mar. 21, 1922.

Application filed June 19, 1920. Serial No. 390,096.

*To all whom it may concern:*

Be it known that I, SWAN O. PETERSON, a citizen of the United States, residing at Rock Island, in the county of Rock Island and State of Illinois, have invented certain new and useful Improvements in Road-Building Machines, of which the following is a specification.

My invention has reference to road building machines, and relates more particularly to the construction of a road or street formed of cement.

The purpose of the present invention is to perform said operations of spreading, smoothing, etc., including the marking of the work transversely, to form joints therein, entirely by machinery in such a manner that there will be no necessity for trespassing upon the piece of road that is being built, or touching the same, except with the tools which are carried by the machine, and are specially designed for such purpose. These tools, with the exception of parts for the adjustment thereof, have a permanent connection with the machine, and are carried thereon during the operation of the machine, or when the same is moved from one point to another.

The machine is constructed and arranged so as to be readily adapted for use on roadways of varying widths. It is capable of being self-propelled, so as to be gradually moved along the piece of work as it progresses, and it can also be moved in a direction lengthwise of the machine, when it is desired to transport the same for a considerable distance.

In the accompanying drawings, which present a preferred embodiment of the invention,—

Figs. 1, 2, and 3 are plan views, showing respectively, a central and two end portions of the device, said portions, when placed end to end, forming a complete machine. In Figures 2 and 3 certain parts are in section to more fully illustrate the same.

Fig. 4 is an end view of the machine.

Fig. 5 is a fragmentary end elevation of the carrying and steering devices of the machine.

Fig. 6 is a plan view thereof.

Fig. 7 is a detail of the central operator's platform, and parts associated therewith.

Fig. 8 shows one arrangement of the connecting rods 66 and appurtenant parts, in detail.

Fig. 9 is an end view of the belt 106 and tightening devices therefor.

Fig. 10 shows one form of scraper, detached.

Fig. 11 is a detached view of the smoothing mechanism.

Fig. 12 shows a fragmentary part of the roller devices.

Fig. 13 is a similar view thereof, reduced.

Fig. 14 is a detail of one of the truss devices.

Fig. 15 is a detail of the marking devices, somewhat contracted as to length.

The device comprises broadly a portably mounted frame having a central platform, mounted above which is an operator's platform, and end platforms from which are supported similar parts which carry the operating devices. The various parts at one end of the machine are duplicated at the opposite end thereof, so that when any of such parts are referred to it will be understood to include counterparts at both ends of the machine.

13 represents a central platform, above which is mounted a platform 14, at each end of which, but spaced apart therefrom, is a platform 15. The platforms 13 and 15 are on the same horizontal plane, and are united by means of rods 16, supported at their inner ends in cylinders 17, and having a telescopic connection at their outer ends in cylinders 18, attached to the lower faces of the platforms 15. By adjustment of the rods 16 in the cylinders 18 the spaces between the end platforms 15 and central platform 13 can be varied, as desired. The rods 16 are arranged in pairs at each side of the platform, one above another, the central supports 17 being united by frames 17ª, as shown in Fig. 15. This provides a sufficient supporting means for the central platform to hold the same in substantial horizontal alignment with the end platforms.

Mounted on the platform 14 is a motor 19, by means of which power is imparted to a shaft 20, from which it can be communicated to a main drive shaft 21, journaled on the platform 14, by means of a gear train, comprising a gear wheel 22 on the shaft 20, in mesh with a gear-wheel 23 on an intermediate shaft 24, and a gear-wheel 25 on the shaft 21, in mesh with the wheel 23. The wheel 25 can be thrown out of engagement with the wheel 23 by means of a shift-collar 26, engaged by a hand-lever 27. Said wheel 25 is mounted on the shaft 21 so as to be slidable thereon, but rotatable therewith, the action of the lever 27 moving said wheel a sufficient distance along the shaft to disengage it from the wheel 23. By a reverse movement it is returned to an operative position. The movement of the shaft 21 can be reversed by means of a train of gear-wheels, comprising a wheel 28 fixed on the shaft 24, a wheel 29 on a shaft 30 journaled on the platform 14, and a wheel 31 rotatable with the shaft 21, and slidable thereon, said wheel 31 being adapted to be shifted into engagement with the wheel 29 by means of a collar 32 slidable with said wheel, and engaged by a shift-lever 33.

On the ends of the shaft 21 are clutch-collars 33$^a$, adapted for engagement with pulleys 34 on said shaft, united by belts 35 with drums on a shaft 36, through which movement is imparted to carrying-wheels 37 by the following means. Said wheels are mounted on short shafts 38, journaled in brackets 39, which brackets are united with the platforms 15 by means of vertical shafts 40, also journaled in brackets 41 supported from said platforms. Forming a telescopic extension of the shaft 36 is a shaft 42, on the outer end of which is a bevel-gear wheel 43 in mesh with a similar wheel 44 loosely mounted on the shaft 40, which in turn is in mesh with a bevel-gear wheel 45 on the inner end of the axle 38. The shaft 42 is held in fixed relation with the shaft 36 by means of set-screws or similar means, and the rotary movement of the shaft 36 is imparted through the shaft 42, and gearing at the end thereof, to the wheel 37, to rotate the same. Fixed on the pivot 40 is a worm-gear wheel 46, in mesh with a worm 47 on the end of a telescopic rod 48–49, the central portion of which is provided with a gear-wheel 50, adapted to be driven by a worm gear 51 on the lower end of a post 52, mounted in the platform 14, on the upper end of which is a hand-wheel 53. By operation of said hand-wheel movement can be imparted to the pivot 40 to give a partial rotation thereto, and with it to the bracket 39, turning the wheel 37, which is normally at a right angle with the shaft 36, to any desired angle therewith. The wheels 37 are adapted to run on a curb or form at opposite sides of the roadway, and for guiding purposes are provided with flanged rims 55, which engage the inner edges of the forms, indicated at 54, and prevent lateral movement of the machine. The rims 55 are removable, and when it is desired to transport the machine from one piece of work to another, such rims are removed, and the flat faces of the wheels permitted to engage the earth. The machine is also provided with carrying wheels 56, mounted on the ends of arms 57, having a pivotal connection with brackets 58, as at $a$. The arms 57 are connected with the brackets 39 by rods 59, so that the swinging movement of the brackets is imparted to the arms 57, causing a turning of the wheels 56 in the same direction and to the same degree, as the wheels 37. The wheels 56 are also provided with removable rims, similarly to the wheels 37. When the machine is en route the wheels are turned until it is in line with the road, when they are held in position at right angles to their normal position, permitting the machine to be moved longitudinally, occupying but a small part of the width of the road.

The clutches 35$^a$ are operated by means of levers 35$^b$, united by a rod 35$^c$, which is connected with a hand-lever 35$^d$, through toggle-joints 35$^e$. When the lever 35$^d$ is raised it operates to move the clutches 33$^a$ toward each other, causing a simultaneous engagement thereof.

At each end of the shaft 21 is secured thereto a gear-wheel 60, in mesh with a similar wheel 61 on a shaft 62 rotatably mounted on the platform 13. The outer end of the shaft 62 is journaled in bearings on the platform 15, and is provided at its outer end with a bevel-gear wheel 63, in mesh with a similar wheel 64 on one end of a crank-shaft 65, mounted on the platform 15 at right angles to the shaft 62. Connected with said crank-shaft are crank-arms 66, having a loose connection at their outer ends with carriages 67, 68, 69, and 70, having reciprocating movement on a platform 71 supported beneath the platform 15, as hereinafter described, and set forth.

Fixed to the shaft 62 above the platform 13, is a pulley 72, connected by a belt 73 with a pulley 74, running loose on a shaft 75, journaled at its inner end on the platform 13 and at its outer end on the platform 15. At its outer end the shaft 75 is provided with a pair of gear-pinions 76, in engagement with gear-racks on the sides of posts 77, passing through openings in the platform 15, and fixed to the platform 71. Similar posts 78 are engaged by gear pinions 79 on a shaft 80, journaled on the platform 15, movement being imparted to said pinions, simultaneously with the movement of the pinions 76, by means of a shaft 81 mounted on the platform 15, provided at its opposite ends with bevel-gear wheels 82 and 83, in mesh, respectively, with similar wheels 84 on the shaft 75 and 85 on the shaft 80. Slidable on the inner end of the shaft 75, and rotatable therewith, is a clutch collar 86, adapted for engagement with the pulley 74, to cause the same to rotate with the shaft 75. Said clutch is controlled by a lever 87, such levers at opposite sides of the platform 14 being united by a rod 88, with which a hand-lever 89 has a toggle-joint connection, the movement of said hand-lever upwardly operating to cause a simultaneous engagement of the clutches 86. This causes a rotation of the shafts 75 at each end of the machine, and a movement of the posts 77 and 78 upwardly or downwardly, as desired, changing the position of the platforms 71 with relation to the platforms 15, for the purposes hereinafter shown.

At their inner ends the shafts 75 are provided with gear-wheels 90, engaging similar wheels 91 on a shaft 92 journaled on the platform 13. The gear-wheels 90 and 91 are in mesh with teeth on the sides of posts 93 and 94, which extend downwardly through openings in the platform 13, and are attached to a platform 95 beneath said first-named platform (Fig. 7). The platform 95 is intended to be held on the same level with the end platforms 71, and as such end platforms are raised or lowered, the platform 95 is correspondingly raised or lowered.

The end platforms 15 are further braced by means of truss rods secured at their ends in keepers 97 attached to the platforms 15, and passing over supports on the central platform. Said rods are provided with short sections 98, united by turn-buckles 99, the shorter sections being removed when it is desired to reduce the space between the table 13 and end tables 15. Two of such rods are shown in the drawings, but any desired number may be employed.

Referring to Fig. 4, each of the plates 67, 68, 69, and 70 is provided on its lower face with pairs of plates 100, between which are held operating devices which extend from one side of the machine to the other. These devices consist of a leveler 103, a former 104, a smoother 105, and a finisher 106, each of which is permitted a reciprocating movement with the plates above mentioned, transversely of the work which is being constructed. The plates 100 are provided on their outer faces with rollers 101, operating in channel-plates 102 secured to the platform 71. Just in advance of the leveler 103 at each side of the machine, is supported a shield 107, which travels just inside of the form 54, and prevents the material from working outwardly over the form at the ends of the leveler.

On account of the possible variation in the spacing between the platforms 15 and 71 it is necessary to provide some means for accommodating the crank-arms 66 thereto, and this may be accomplished as shown in Fig. 8 of the drawings, wherein the outer end of the arm is secured to a link 107, connected with a frame 108. The link has a pivotal connection with the end of the arm and is capable of adjustment vertically on one of the bars of the frame 108. When it is desired to raise the platform 71 the end of the link 107 is permitted to slide upwardly on the frame post as the change in the spacing of the platforms proceeds, such link being secured in its new position by means of a set screw or similar means, engaging the frame. The movement of the crank 65 will be imparted to the frame, to cause the same to reciprocate, in any position that the platforms occupy with relation to each other.

The leveler 103 and former 104 can be provided with any desired shape at their lower edges, to conform to the style of road that is being constructed. In Fig. 10 of the drawings the former 104 is shown with its lower edge raised in the center, to give the road a desired crown, and said part is shown provided with central sections 109, detachably connected at their ends, and supported at the center by a plate 110, having a sliding connection with a frame 111, supported on the platform 95. When the machine is being used on a narrower piece of road, one or both of the sections 109 can be removed.

Secured to the platforms 73 in rear of the former 104 are brackets 112, between which are supported rollers 113, which extend a little below the lower edge of the former, and exert a pressure upon the cement in its plastic condition, forcing any surplus moisture out of the same, and making it more compact. Just in rear of the rollers is a scraper 114, which smooths out any inequalities in the work caused by the joints between the rollers. Said rollers are preferably supported between the end brackets by the means shown in Figures 12 and 13 of the drawings, wherein the joints between the rollers are supported by braces 141, capable of vertical adjustment in an angle-plate cross-piece 142. The rollers in the center can thus be raised or lowered to cause the same to conform to the shape of the former 104.

The smoother 105 and finisher 106 each consist of a belt of canvas or similar material, which are drawn tightly so that the lower face of the belt will pass along the surface of the concrete. The belt 105 is preferably inclined upwardly a little at its forward edge, so as not to cut into the work. Said belts can be secured at one end of the machine, and provided with tightening means at the other end, such as is shown in Fig. 9, wherein a frame 115 is provided in its upper end with a roller 116, upon which the belt 106 is wound, by means of a crank 117 on the end thereof. The roller 116 is also provided with a ratchet wheel 118 at one of its ends, engaged by a dog 119 on the frame, by which means the belt is held from unwinding. The frame 115 is supported on the platform 71, as shown in Fig. 4. In changing from one width of work to another, the belt can be wound or unwound, as desired.

The machine is also shown provided with a jointing device, consisting of a marker 120, adapted to operate transversely of the roadway in rear of the other operating devices, by means of a pair of rollers 121 thereon, travelling in channl-plate tracks 122, supported from the end platforms 71. (Figs. 4 and 14.) The marker can be drawn from one side of the machine to the other by means of a cable 123, passing round rollers 124 at the ends of the machine, and having a winding on a drum 125 on a shaft 126, journaled on the platform 14. (Fig. 1.) The drum 125 runs loosely on the shaft, and is adapted to be driven by a clutch 127, slidable on the shaft 126, and rotatable therewith. Said clutch is provided with a clutch lever 128, for suitable operatiton. At its inner end the shaft 126 is fitted with a bevel-gear wheel 129, adapted for alternate engagement with similar wheels 130, mounted on the ends of a sleeve 131, slidable on the shaft 21, and rotatable therewith, said sleeve being provided at one end with a collar 132 and hand-lever 133. The movement of the shaft 126 can by the above described means be reversed, and the marker 120 caused to travel in either direction. At each end of the machine the guides 122 are provided with upwardly curved portions, which operate to elevate the marker from engagement with the work. In practice the marker would be held in such position until the machine had traveled a desired distance, whereupon the machine would be stopped, and the marker drawn from one side of the work to the other, the blade thereof being of sufficient width to cut through the cement, while yet in a plastic condition, and form a good joint therein. The marker would then be elevated at the opposite side of the machine, and retained at that side until the machine reaches a point where another joint in the material is required, whereupon it would be again returned to the side from which it started.

The belts 105 and 106 can be made to conform to the surface of the work upon which they are used by means shown in Fig. 11, wherein are shown plates 136, fitted for attachment to the central platform 95, in which are held vertical rods 137 provided on their lower ends with rollers 138, which act against the inner surface of the belt. Curved rods 139 are also provided, having rollers 140, operating against the belt at a distance from the rollers 138. All of said rods are capable of adjustment with relation to the plates 136, so as to enable the central part of the belt to be held at a greater or less distance therefrom, as desired.

When the machine is in use, it is moved gradually forward, all of the operating devices 103, 104, 105, and 106 working in unison, except that the arrangement of the crank-shaft 65 is such that the leveler and former reciprocate oppositely. This is also true of the belts 105 and 106. The piece of work, which is in the rough ahead of the leveler 103, is thus gradually smoothed out, and left in a finished condition, without the necessity of any part of the work being trespassed upon by operators.

It is obvious that many changes can be made in the construction and arrangement of the parts of the machine without departing from the spirit thereof.

What I claim and desire to secure, is:

1. In a device of the class described, a pair of end platforms, provided with carrying wheels pivotally connected therewith; a central platform, having connection with said end platforms, so that said end platforms can be adjusted with relation thereto; means carried by said platforms for imparting rotation to said wheels; means for turning said wheels simultaneously at a desired angle with said platforms; auxiliary platforms supported from said end platforms; and smoothing and finishing devices carried by said auxiliary platforms, and extending between the same.

2. In a device of the class described, a pair of end platforms provided with carrying wheels; a central operator's platforms supported from said end platforms by telescopically united members; auxiliary platforms supported from said end platforms; means for adjustment of the position of said auxiliary platforms with relation to the earth, smoothing and finishing devices carried by said auxiliary platforms, and extending between the same; means for imparting rotation to said carrying wheels; and means for simultaneously giving to said smoothing and finishing devices a transverse reciprocating movement.

3. In a device of the class described, a pair of end platforms, portably mounted; an operator's platforms supported from said end platforms and connected therewith so as to be adjustable with relation thereo; auxiliary platforms supported from said end platforms, capable of adjustment with relation thereto; a pair of operating devices supported from said auxiliary platform, and extending between the same; means for imparting to said devices a reciprocating movement in opposite directions; and means for adjusting the position of said auxiliary platforms with relation to said end platforms.

4. In a device of the class described, a pair of end platforms, portably mounted; a central platform connected therewith by telescopic members; auxiliary platforms supported from said platforms; a leveling device supported at its ends by said auxiliary platforms; a forming device supported at its ends by said auxiliary platforms; means for adjustment of said leveling and forming devices with relation to the earth; and means for imparting to said devices a reciprocating movement in opposite directions.

5. In a device of the class described, a pair of end platforms, portably mounted, and capable of adjustment toward and from each other; auxiliary platforms supported beneath said end platforms, and capable of adjustment towards and from the same; a leveling device supported from said auxiliary platforms; a forming device supported from said auxiliary platforms in rear of said leveling device; a plurality of rollers in rear of said forming device; and a scraper in rear of said rollers.

6. In a device of the class described, a portable frame, and means for propelling the same; and a belt supported at its ends by said frame so as to have engagement with the surface of a piece of plastic cement work over which said frame travels.

7. In a device of the class described, a portable frame, and means for propelling the same; a belt supported at its ends by said frame, so as to have engagement with the surface of a piece of plastic cement work over which said frame is traveling; and means for increasing or decreasing the tension of said belt, at will.

8. In a device of the class described, a portable frame, and means for propelling same; a belt supported at its ends by said frame so as to have engagement with a piece of cement road work over which said frame is traveling; means for imparting a reciprocating movement to said belt coincidently with the movement of the frame; and means for adjustment of said belt with relation to the earth.

9. In a device of the class described, a pair of end platforms and carrying wheels therefor; a central platform connected with said end platforms by telescopically adjustable members; auxiliary platforms supported by said end platforms, and capable of adjustment vertically with relation thereto; leveling and forming devices supported by said auxiliary platforms so as to have reciprocating movement therein; smoothing and finishing devices supported at their ends by said auxiliary platforms, so as to be reciprocable therein; crank-shafts mounted on said end platforms in proximity to the ends of said leveling, forming smoothing and finishing devices, and operatively connected therewith; power generating devices supported by said central platform; means for imparting movement from said power devices to said crank-shafts; and means for imparting movement from said power devices to said drive-wheels, to actuate the same, simultaneously with the movement of said crank-shafts; the arrangement of said crank-shafts being such that said leveling and forming devices will be reciprocated in opposite directions, and said smoothing and finishing devices will be operated in opposite directions.

10. In a device of the class described, portable end platforms; a central platform supported thereby and connected therewith by telescopically adjustable members; auxiliary platforms supported by said end platforms, and capable of adjustment with relation thereto; road operating devices supported at their ends by said end platforms so as to be capable of a reciprocating movement thereon; crank-shafts mounted on said end platforms in proximity to the ends of said operating devices; crank-arms connecting said crank-shaft with said operating devices; power generating means carried on said central platform and operatively connected with said crank-shafts; and means for adjusting the positions of said crank-arms with relation to said operating devices, to accommodate the same to the change in spacing of the end platforms and auxiliary platforms.

11. In a device of the class described, portable end platforms; a central platform supported thereby and connected therewith by telescopically adjustable members; auxiliary platforms supported by said end platforms so as to be adjustable with relation thereto; an auxiliary platform supported by said central platform so as to be adjustable with relation thereto; operating devices supported by said auxiliary platforms; means for simultaneously raising or lowering all of said auxiliary platforms, as desired; power generating devices carried by said central platform; and means for imparting the movement of said power generating devices to said platform operating means, to suitably actuate the same.

In testimony whereof I affix my signature.

SWAN O. PETERSON.